United States Patent [19]
Chung

[11] Patent Number: 5,353,156
[45] Date of Patent: Oct. 4, 1994

[54] PROJECTION LENS SYSTEM

[75] Inventor: Chong-sam Chung, Suwon, Rep. of Korea

[73] Assignee: Samsung Electronics Co., Ltd., Kyungki-do, Rep. of Korea

[21] Appl. No.: 997,751

[22] Filed: Dec. 30, 1992

[30] Foreign Application Priority Data

Jul. 31, 1992 [KR] Rep. of Korea .................. 92-13858

[51] Int. Cl.$^5$ .................. G02B 13/18; G02B 9/64
[52] U.S. Cl. .................. 359/649; 359/634; 359/650; 359/708
[58] Field of Search .............. 359/634, 708, 649, 650, 359/644, 662, 663, 757, 764, 776, 791

[56] References Cited

U.S. PATENT DOCUMENTS

| | | |
|---|---|---|
| 4,764,806 | 8/1988 | Altman . |
| 4,842,394 | 6/1989 | Buchroeder . |
| 4,900,139 | 2/1990 | Kreitzer . |
| 4,963,007 | 10/1990 | Moskovich . |
| 4,976,525 | 11/1990 | Matsumura et al. ............... 359/649 |
| 4,981,352 | 1/1991 | Tejima et al. ................... 359/649 X |
| 5,048,940 | 9/1991 | Ueda et al. ...................... 359/708 |
| 5,066,113 | 11/1991 | Nakajima et al. ................ 359/649 |
| 5,168,351 | 12/1992 | Bradley et al. ................... 359/649 |

Primary Examiner—Eugene R. LaRoche
Assistant Examiner—Huan Hoang
Attorney, Agent, or Firm—Lowe, Price, LeBlanc & Becker

[57] ABSTRACT

A projection lens system includes a first lens group for correcting spherical aberration and coma aberration, a second lens group for correcting chromatic aberration, a third lens group for providing the main optical power for the whole system, and a fourth lens group for correcting petzval aberration. The first, second and third lens groups are sequentially disposed forward of a screen in front of a dichromatic mirror, and the fourth lens group is disposed between the CRTs and dichromatic mirror. Further, the fourth lens group and CRTs form an enclosure and are filled with transparent cooling oil, thereby accomplishing a high-resolution color image having no chromatic aberration and using a reduced number of lenses.

6 Claims, 2 Drawing Sheets

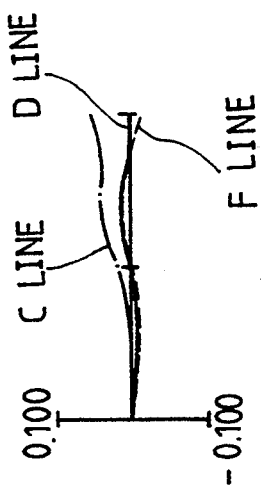
FIG. 2A
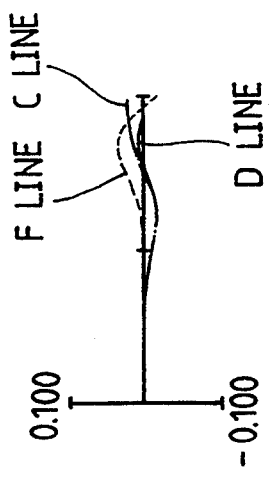
FIG. 3A
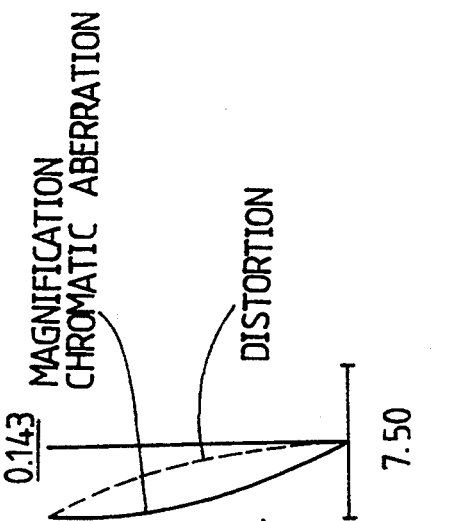
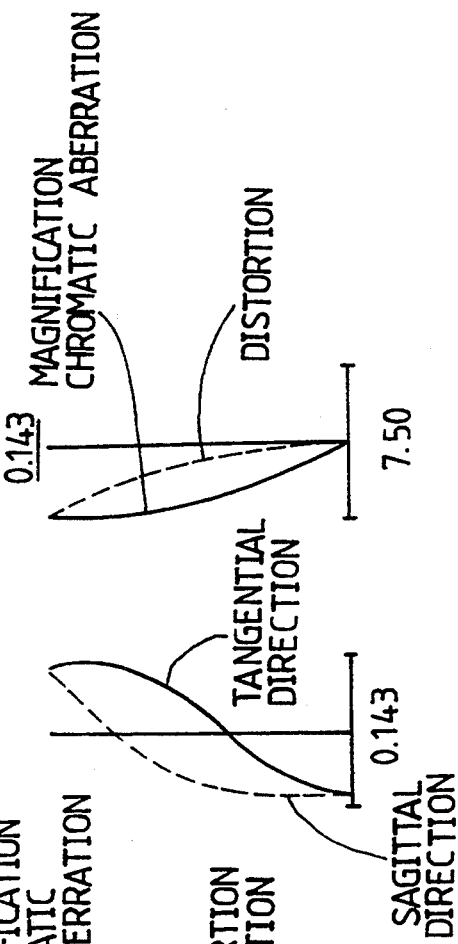
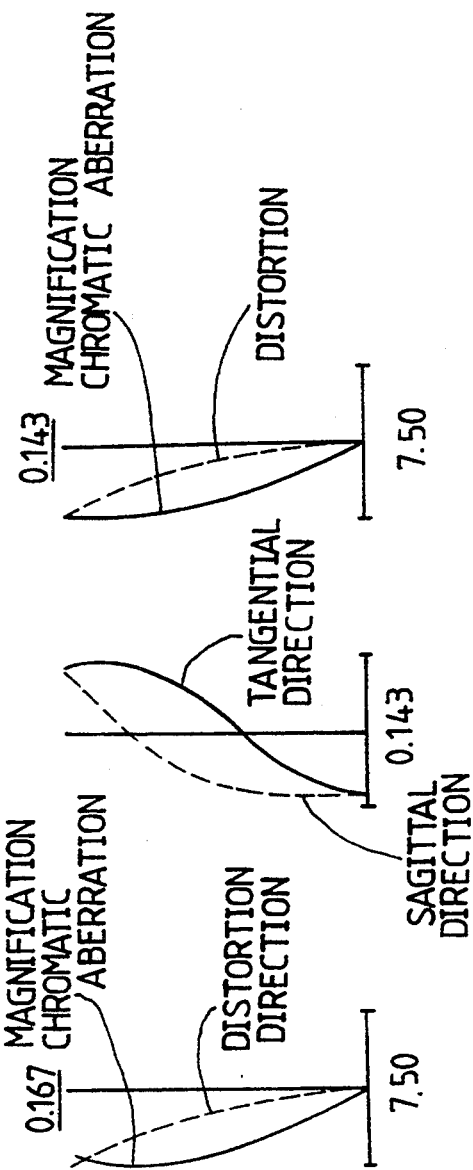
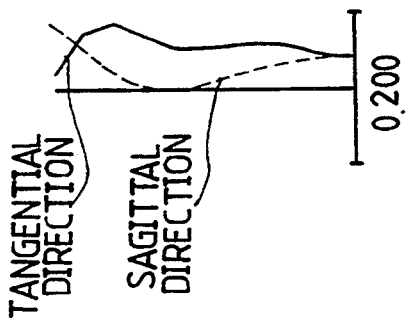

PROJECTION LENS SYSTEM

BACKGROUND OF THE INVENTION

The present invention relates to a projection lens system for mixing images of a plurality of cathode ray tubes (CRTs) to enlarge and project the mixed images, and more particularly, to a projection lens system in which chromatic aberration is corrected.

Generally, using three monochrome CRTs each generating red, green and blue images as an image source, a video projector or projection television mixes the images and enlarges and projects the mixed color images forward onto a large screen. Since each of the three monochrome CRTs has narrow band of spectrum which is not of a strictly monochrome wavelength, they require a projection lens for correcting chromatic aberration, so as to realize a high-resolution color image.

A general lens in which the chromatic aberration is not corrected is designed on the basis of green wavelengths, and lens performances for red or blue wavelengths are approximately 30% less than that for green wavelength. Therefore, in order to realize high-resolution color images, a projection lens is needed wherein chromatic aberration is corrected for throughout the visible light band.

A projection apparatus for realizing a large image (greater than 100 inches) using three CRTs as an image source is roughly divided into two types: one having three CRTs and three lens units (see U.S. Pat. Nos. 4,963,007 and 4,900,139) and the other having three CRTs and one lens unit (see U.S. Pat. Nos. 4,764,806 and 4,842,394). Now, due to its easy adjustment of screen size, the latter apparatus is chiefly used.

In the triple-CRT single-lens projection apparatus as disclosed in the abovementioned U.S. patents, three CRTs are arranged in a "T" configuration. Each of the three CRTs has a concave image-generating surface having a small radius of curvature and generates a red, green or blue image. The images are mixed by means of two dichromatic mirrors which are disposed in a "X" configuration at the intersection of the light axes of the T-configured CRTs, and then the mixed images are enlarged and projected onto the forward screen by the projection lens. Thus, the projection lens projects a color image containing all the visible light wavelengths. However, conventionally, since the correction of chromatic aberration throughout the visible light band was not considered in designing such a projection lens, projecting color image having HDTV-level resolution on a large screen was impossible.

SUMMARY OF THE INVENTION

Therefore, to solve the above-described drawbacks, it is an object of the present invention to provide a projection lens system which is improved to project a high-resolution, large-scale color image having higher resolution than that of HDTV in view of characteristics of the spectral distribution of red, green and blue images by means of three monochrome CRTs.

To accomplish the above object of the present invention, there is provided a projection lens system having a plurality of CRTs for generating different monochrome images and at least one dichromatic mirror for chromatically mixing the images, so as to enlarge and project a color image, comprising a first lens group for correcting spherical aberration and coma aberration, a second lens group for correcting chromatic aberration, a third lens group for providing the main optical power for the whole system, and a fourth lens group for correcting petzval aberration, wherein the first, second and third lens groups are sequentially disposed forward of the dichromatic mirror, and the fourth lens group is disposed between the CRTs and dichromatic mirror.

In the projection lens system of the present invention, since the fourth lens group, which is separated from the first, second and third lens groups disposed foward of the dichromatic mirror and is placed directly in front of the image-generating surfaces of the CRTs, corrects in advance the petzval aberration produced on the refracting surfaces of the lens components located forward of the fourth lens group, the aberration of the whole system can be easily corrected and the number of lens components can be also reduced. Particularly, the second lens group corrects the chromatic aberration of a projected color image by combining a high-dispersing lens and a low-dispersing lens. By doing so, the projection lens system of the present invention can project a large color image having even higher resolution than that of HDTV, with a reduced number of lenses. Further, the fourth lens group enhances the CRT cooling efficiency and allows the dichromatic mirror to have maximal optical performance.

BRIEF DESCRIPTION OF THE DRAWINGS

The above object and other advantages of the present invention will become more apparent by describing in detail a preferred embodiment thereof with reference the attached drawings in which:

FIGS. 2A, 2B and 2C are aberration graphs for the projection lens system according to the first embodiment of the present invention, wherein FIG. 2A shows spherical aberration, FIG. 2B shows oblique astigmatism, and FIG. 2C shows distortion; and FIGS. 3A, 3B and 3C are aberration graphs for the projection lens system according to the second embodiment of the present invention, wherein FIG. 2A shows spherical aberration, FIG. 2B shows oblique astigmatism, and FIG. 2C shows distortion.

DETAILED DESCRIPTION OF THE INVENTION

Figure 1:
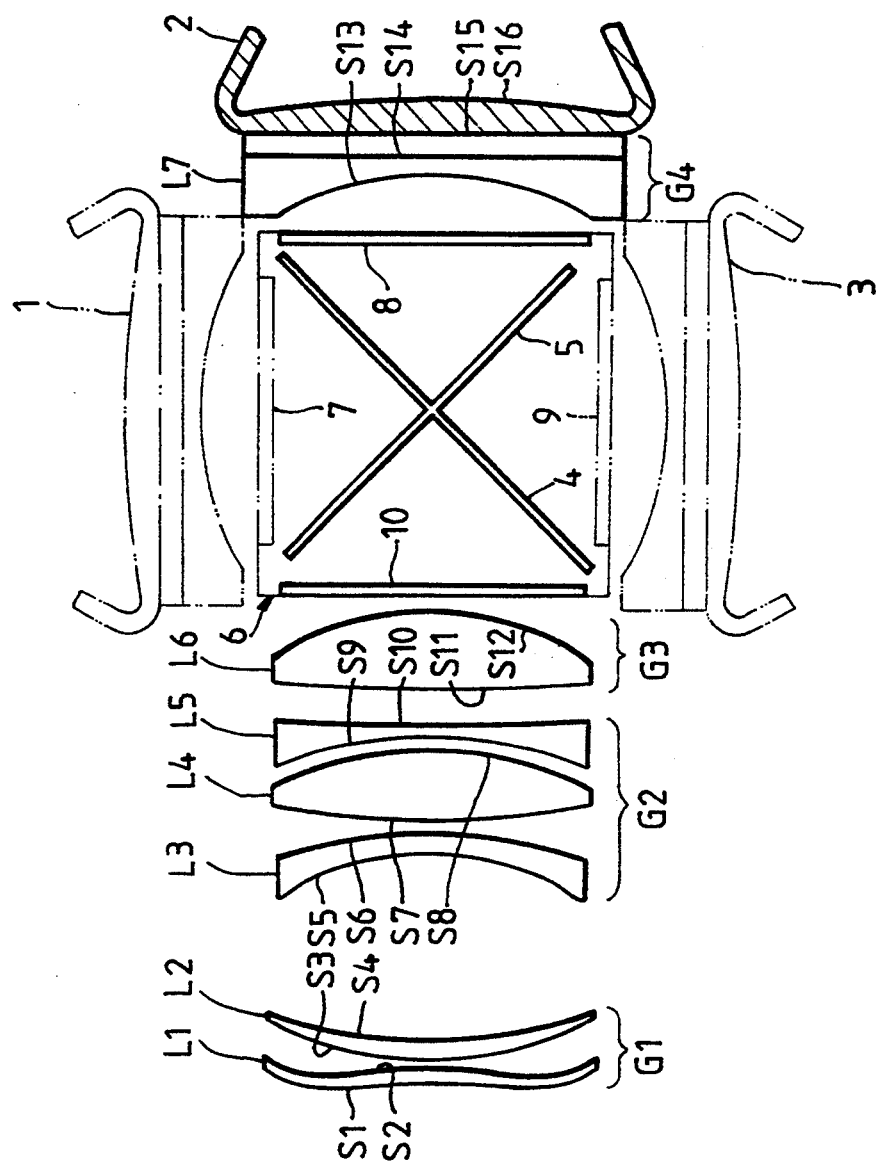
FIG. 1 illustrates a layout of a projection apparatus comprising a projection lens system according to the present invention.

Referring to FIG. 1, the projection apparatus having the projection lens system of the present invention comprises three monochrome CRTs 1, 2 and 3 for providing red, green and blue images, two dichromatic mirrors 4 and 5 for combining two images, and four lens groups G1, G2, G3 and G4.

The three monochrome CRTs 1, 2 and 3 are arranged in a T-configuration centering around green CRT 2, and red and blue CRTs 1 and 3 are disposed opposite each other, so that the light axes of all three CRTs intersect at one point. Monochrome CRTs 1, 2 and 3 each has a flat outer surface S15 but has a concave image-generating inner surface S16.

Dichromatic mirrors 4 and 5 are disposed in an X-configuration at the intersection of the light axes of monochrome CRTs 1, 2 and 3, and are installed inside a box 6 filled with transparent oil and respectively having windows 7, 8, 9 and 10 in the four sides. The transparent oil has almost the same refractive index as that of dichromatic mirrors 4 and 5. Dichromatic mirror 4 reflects the red image provided by monochrome CRT 1 and transmits the other images. Dichromatic mirror 5 reflects the blue image provided by monochrome CRT 3 and transmits the other images.

The projection lens system has the four lens groups in which lenses of low-dispersing material and lenses of high-dispersing material are appropriately combined so as to correct axial chromatic aberration and magnification chromatic aberration. In the four lens groups, the first, second and third lens groups G1, G2 and G3 are disposed in front of dichromatic mirrors 4 and 5 and the fourth lens group G4 is disposed between monochrome CRTs 1, 2 and 3 and dichromatic mirrors 4 and 5.

The first lens group G1 is composed of two aspherical lenses L1 and L2 so as to correct spherical aberration and coma aberration. The two aspherical lenses L1 and L2 are made of high-dispersing material and low-dispersing material, respectively, so as to correct their own chromatic aberrations.

The second lens group G2 is composed of lenses L3 and L5 of low-dispersing material having a negative optical power and a lens L4 of high-dispersing material having a positive optical power so as to correct the chromatic aberration of the whole optical system. The first lens L3 is aspherical to control the aberration.

The third lens group G3 has a spherical lens L6 to provide the main optical power of the system.

The fourth lens group G4 has a lens L7 having a negative optical power and a concave surface S13 toward the screen so as to correct petzval aberration produced from the above lens groups. Here, for the cooling of the heat produced from the CRTs, lens L7 and each of the CRTs form a closed space which is filled with cooling oil.

The above-described projection lens system according to the present invention satisfies the following equations:

$$0.95 < \frac{f}{f_6} < 1.05 \quad (1)$$

$$-0.1 < \frac{f}{f_3 + f_4 + f_5} < 0.1 \quad (2)$$

$$\nu < 40 \quad (3)$$

where f is the focal length of the optical system; $f_i$ is the focal length of the ith lens from the screen (where, i is a positive integer); and $\nu$ is the dispersion index of the negative second lens group.

Equation 1 is for lens L6 of the third lens group G3 having an optical power functioning as the main optical power for the whole optical system, and establishes conditions for disposing monochrome CRTs 1, 2 and 3 in T configuration and for space provided for placing oil box 6 of dichromatic mirrors 4 and 5 in front of the CRTs.

Equations 2 and 3 are for the second lens group G2 and are the conditions to correct the chromatic aberration of the whole optical system.

The following Table 1 shows optical data of the first embodiment of the projection lens system of the present invention when the focal length of the optical system is 181 mm and its F-number is 1.29. In Table 1, distance (mm) represents the optical distance between ith surface and i+1th surface. Table 2 shows aspherical coefficients D, E, F and G for the aspherical surfaces of the respective lenses of Table 1.

TABLE 1

(EMBODIMENT 1)

| lens | surface No. | curvature radius(mm) | distance (mm) | refractive index | dispersion index |
|------|-------------|----------------------|---------------|------------------|------------------|
| L1 | S1 | −367.6086 (aspherical) | 6.0 | 1.491 | 61.4 |
|    | S2 | −237.7812 (aspherical) | 4.0 | | |
| L2 | S3 | 174.2892 (aspherical) | 8.0 | 1.590 | 29.5 |
|    | S4 | 196.8107 (aspherical) | 77.299 | | |
| L3 | S5 | −116.9376 (aspherical) | 8.0 | 1.590 | 29.5 |
|    | S6 | −173.4852 (aspherical) | 5.0 | | |
| L4 | S7 | 358.2697 | 29.22 | 1.517 | 64.2 |
|    | S8 | −147.2564 | 6.0 | | |
| L5 | S9 | −173.9513 (aspherical) | 6.0 | 1.590 | 29.5 |
|    | S10 | −69620.0000 (aspherical) | 13.0 | | |
| L6 | S11 | 906.5306 | 32.20 | 1.598 | 61.3 |
|    | S12 | −119.4484 | 3.6 | | |
| dichromatic mirror box | | | 150.0 | 1.474 | 60.0 |
| | | | 25.0 | | |
| L7 | S13 | −127.1346 (aspherical) | 7.0 | 1.590 | 29.5 |
|    | S14 | ∞ | 10.0 | 1.474 | 60.0 |
| CRT | S15 | ∞ | 13.1 | 1.540 | 29.5 |
|    | S16 | −500.0 | | | |

TABLE 2

(aspherical surface coefficient)

| surface No. | D | E | F | G |
|-------------|---|---|---|---|
| S1 | $0.1111419e^{-6}$ | $0.8107103e^{-10}$ | $0.1702111e^{-14}$ | $0.8569273e^{-19}$ |
| S2 | $0.1974065e^{-6}$ | $0.8270570e^{-10}$ | $0.1393503e^{-14}$ | $0.3902901e^{-18}$ |
| S3 | $0.4785881e^{-7}$ | $0.7070935e^{-11}$ | $0.4033568e^{-15}$ | $0.3052295e^{-18}$ |
| S4 | $-0.2979030e^{-7}$ | $-0.1252894e^{-11}$ | $0.9656229e^{-14}$ | $0.5785128e^{-18}$ |
| S5 | $-0.6333464e^{-7}$ | $-0.9604905e^{-11}$ | $-0.3795875e^{-14}$ | $0.5785128e^{-18}$ |
| S6 | $0.4106611e^{-7}$ | $0.2645230e^{-11}$ | $0.1962466e^{-14}$ | $0.3099969e^{-19}$ |
| S9 | $-0.3310326e^{-7}$ | $-0.1379641e^{-12}$ | $0.7323238e^{-17}$ | $-0.4052388e^{-18}$ |
| S10 | $0.6158345e^{-7}$ | $0.2302938e^{-11}$ | $-0.7718488e^{-14}$ | $-0.3772541e^{-18}$ |
| S13 | $-0.3965148e^{-7}$ | $-0.7971356e^{-11}$ | $0.2883824e^{-14}$ | $0.2290973e^{-18}$ |

The result according to the first embodiment is shown in FIGS. 2A, 2B and 2C. FIG. 2A shows spherical aberrations on the D line (full line) of wavelength 0.5876, the F line (dotted line) of wavelength 0.4861, and the C line (single-dot-single-dash line) of wavelength 0.6563. FIG. 2B shows the curvature field (full line) in the tangential direction and the curvature field (dotted line) in the sagittal direction. FIG. 2C shows magnification chromatic aberration (full line) and distortion (dotted line). The following Table 3 shows optical data of the second embodiment of the projection lens system of the present invention when the optical system's focal length is 185 mm and its F-number is 1.32.

Table 4 shows aspherical coefficients D, E, F and G for the aspherical surfaces of the respective lenses of Table 3.

TABLE 3

(EMBODIMENT 2)

| lens | surface No. | curvature radius(mm) | distance (mm) | refractive index | dispersion index |
|---|---|---|---|---|---|
| L1 | S1 | 562.0390 (aspherical) | 6.0 | 1.491 | 61.4 |
|  | S2 | −9740.0000 (aspherical) | 5.0 |  |  |
| L2 | S3 | 241.4063 (aspherical) | 8.0 | 1.590 | 29.5 |
|  | S4 | 317.1898 (aspherical) | 52.92 |  |  |
| L3 | S5 | −265.7672 (aspherical) | 8.0 | 1.590 | 29.5 |
|  | S6 | −885.8502 (aspherical) | 5.0 |  |  |
| L4 | S7 | 386.1253 | 27.76 | 1.517 | 64.2 |
|  | S8 | −140.3984 | 6.0 |  |  |
| L5 | S9 | −163.3389 | 6.0 | 1.673 | 32.2 |
|  | S10 | −2612.0000 | 13.0 |  |  |
| L6 | S11 | 515.1076 | 27.73 | 1.598 | 61.3 |
|  | S12 | −133.8934 | 3.69 |  |  |
| dichromatic mirror box |  |  | 150.0 | 1.474 | 60.0 |
|  |  |  | 25.0 |  |  |
| L7 | S13 | −118.2484 (aspherical) | 7.0 | 1.590 | 29.5 |
|  | S14 | ∞ | 10.0 | 1.474 | 60.0 |
| CRT | S15 | ∞ | 13.1 | 1.540 | 50.0 |
|  | S16 | −500.0 |  |  |  |

TABLE 4

(aspherical surface coefficient)

| surface No. | D | E | F | G |
|---|---|---|---|---|
| S1 | $0.1072955e^{-6}$ | $0.7759880e^{-10}$ | $0.9142163e^{-14}$ | $0.1769033e^{-18}$ |
| S2 | $0.2018650e^{-6}$ | $0.8384885e^{-10}$ | $0.1457109e^{-14}$ | $0.3038061e^{-18}$ |
| S3 | $0.5419372e^{-7}$ | $0.7117988e^{-11}$ | $0.2199248e^{-15}$ | $0.1888374e^{-18}$ |
| S4 | $-0.3654107e^{-7}$ | $-0.1190090e^{-11}$ | $0.1109924e^{-14}$ | $0.1418500e^{-18}$ |
| S5 | $-0.9277567e^{-7}$ | $-0.8234376e^{-11}$ | $-0.7694884e^{-15}$ | $0.1480282e^{-18}$ |
| S6 | $0.8200734e^{-7}$ | $0.6402602e^{-11}$ | $0.7986209e^{-14}$ | $0.1458536e^{-19}$ |
| S13 | $-0.4276285e^{-7}$ | $-0.1727116e^{-10}$ | $0.3540083e^{-14}$ | $-0.9394012e^{-19}$ |

The result according to the second embodiment is shown in FIGS. 3A, 3B and 3C. FIG. 3A shows spherical aberrations on the D line (full line) of wavelength 0.5876, the F line (dotted line) of wavelength 0.4861, and the C line (single-dot-single-dash line) of wavelength 0.6563. FIG. 3B shows the curvature field (full line) in the tangential direction and the curvature field (dotted line) in the sagittal direction. FIG. 3C shows magnification chromatic aberration (full line) and distortion (dotted line).

According to the embodiments of the present invention, when the projection lens system projects a 7-inch CRT image to a 50-inch or larger screen, an image of a high resolution can be realized.

As described above, in the projection lens system of the present invention for mixing R, G and B images and enlarging and projecting the mixed color images, lenses of low-dispersing material and lenses of high-dispersing material are appropriately combined so that the chromatic aberration throughout the visual light band is corrected to realize a high-resolution large-scale color image. Further, a lens component for correcting petzval aberration is installed between the CRTs and dichromatic mirror so that the overall number of lenses is reduced, thus facilitating system design and prolonging the life of the CRTs.

What is claimed is:

1. A projection lens system having a plurality of CRTs each for generating a different monochrome image and at least one dichromatic mirror for chromatically mixing the images, so as to enlarge and project a composite color image onto a screen, said system comprising:

a first lens group for correcting spherical aberration and coma aberration;

a second lens group for correcting chromatic aberration;

a third lens group for providing the main optical power for the whole system; and a fourth lens group for correcting petzval aberration, wherein said first, second and third lens groups are sequentially disposed forward of said dichromatic mirror, said fourth lens group is disposed between said CRTs and dichromatic mirror, and said first, second, third and fourth lens groups are formed with seven lenses in total and satisfy the following conditions $0.95 < f/f_6 < 1.05$ $-0.1 < f/(f_3+f_4+f_5) < 0.1$ $v < 40$ where f is the focal length of the optical system; fi is the focal length of ith lens from the screen, where i is a positive interger, and v is the negative dispersion value of the second lens group.

2. The projection lens system as claimed in claim 1, wherein said first lens group is combined with lens components of low-dispersing material and lens components of high-dispersing material so as to correct its own chromatic aberration, and at least one of the lens components is an aspherical lens for correcting its own chromatic aberration.

3. The projection lens system as claimed in claim 1, wherein said second lens group comprises a lens component of low-dispersing material having negative optical power, a lens component of high-dispersing material having positive optical power, and at least one aspherical lens for the control of aberration.

4. The projection lens system as claimed in claim 1, wherein said third lens group comprises at least one spherical lens.

5. The projection lens system as claimed in claim 1, wherein said fourth lens group comprises a lens component having negative optical power and a concave front surface.

6. The projection lens system as claimed in claim 1, wherein said fourth lens group and CRTs form an enclosure which are filled with transparent cooling oil.

* * * * *